(12) United States Patent
Hwang et al.

(10) Patent No.: US 10,480,620 B2
(45) Date of Patent: Nov. 19, 2019

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 62 days.

(21) Appl. No.: 15/726,611

(22) Filed: Oct. 6, 2017

(65) Prior Publication Data
US 2018/0163833 A1    Jun. 14, 2018

(30) Foreign Application Priority Data
Dec. 12, 2016 (KR) .......................... 10-2016-0168892

(51) Int. Cl.
*F16H 3/00* (2006.01)

(52) U.S. Cl.
CPC .................... *F16H 3/006* (2013.01)

(58) Field of Classification Search
CPC ........ F16H 37/065; F16H 3/006; F16H 3/089; F16H 37/0833
See application file for complete search history.

(56) References Cited

U.S. PATENT DOCUMENTS

| | | | |
|---|---|---|---|
| 9,586,470 B2* | 3/2017 | Park | B60W 20/30 |
| 9,744,840 B2* | 8/2017 | Lee | B60K 6/48 |
| 9,982,764 B2* | 5/2018 | Hwang | F16H 3/006 |
| 10,272,764 B2* | 4/2019 | Lee | B60K 6/365 |
| 2012/0065016 A1* | 3/2012 | Tamai | F16H 3/728 475/5 |
| 2012/0160044 A1* | 6/2012 | Kahl | F16H 3/006 74/330 |

(Continued)

FOREIGN PATENT DOCUMENTS

| | | |
|---|---|---|
| JP | 2004-239441 A | 8/2004 |
| JP | 4361794 B | 11/2009 |
| JP | 5827913 B | 12/2015 |

*Primary Examiner* — Patrick H Mackey
(74) *Attorney, Agent, or Firm* — Brinks Gilson & Lione

(57) ABSTRACT

A power transmission apparatus includes: a first input shaft; a second input shaft coaxially disposed with the first input shaft and selectively connected with the first input shaft; a third input shaft coaxially disposed with the second input shaft and selectively connected with the first input shaft; a first output shaft in parallel with the first input shaft; a second output shaft arranged in series to and selectively connected with the first output shaft; a first shift-stage shifting section outputting two shifted torques from the third input shaft to the first output shaft; a second shift-stage shifting section outputting one shifted torque and one reverse torque from the second input shaft to the first output shaft; and a compound shifting section outputting a shifted output torque from a received torque selectively from the first input shaft or the first output shaft.

11 Claims, 3 Drawing Sheets

(56) References Cited

U.S. PATENT DOCUMENTS

| | | | |
|---|---|---|---|
| 2013/0109530 A1* | 5/2013 | Kaltenbach | B60K 6/387 |
| | | | 477/5 |
| 2017/0203646 A1* | 7/2017 | Mueller | F16H 3/728 |
| 2018/0111471 A1* | 4/2018 | Lee | B60K 6/365 |
| 2018/0154757 A1* | 6/2018 | Lee | B60K 6/365 |
| 2018/0361845 A1* | 12/2018 | Mueller | B60W 10/111 |
| 2019/0118635 A1* | 4/2019 | Hwang | B60K 6/365 |

* cited by examiner

FIG. 2

| Shift-stage | CL1 | CL2 | CL3 | CL4 | SL1 | | | SL2 | | |
|---|---|---|---|---|---|---|---|---|---|---|
| | | | | | D1/7 | N | D3/5 | D2/6 | N | D8/RG |
| REV | ● | | | ● | | ● | | | | ● |
| N | | | | | | ● | | | ● | |
| D1 | | ● | | ● | ● | | | | ● | |
| D2 | ● | | | ● | | ● | | ● | | |
| D3 | | ● | | ● | | | ● | | ● | |
| D4 | | | ● | ● | | ● | (○) | | ● | |
| D5 | | ● | ● | | | | ● | | ● | |
| D6 | ● | | ● | | | ● | | ● | | |
| D7 | | ● | ● | | ● | | | | ● | |
| D8 | ● | | ● | | | ● | | | | ● |

● : Engage    ○ : Pre-selection available

POWER TRANSMISSION APPARATUS FOR VEHICLE

CROSS-REFERENCE TO RELATED APPLICATION

This application claims priority to and the benefit of Korean Patent Application No. 10-2016-0168892, filed on Dec. 12, 2016, which is incorporated herein by reference in its entirety.

FIELD

The present disclosure relates to a power transmission apparatus for a vehicle.

BACKGROUND

The statements in this section merely provide background information related to the present disclosure and may not constitute prior art.

Environmentally-friendly technologies for a vehicle are considered as core technologies to survive in a future automobile industry, and most of car makers have focused on the development of an environmentally-friendly vehicle to achieve better fuel efficiency and comply with various environmental regulations.

An electric vehicle (EV) or a hybrid electric vehicle (HEV) that utilizes electrical energy, or a double clutch transmission (DCT) to improve power delivery efficiency and performance of a transmission may be examples of such future vehicle technology.

The double clutch transmission (DCT) includes two clutch devices and a gear train of a basically manual transmission, selectively transmits a torque input from an engine to two input shafts by using the two clutch devices, and outputs a torque shifted by the gear train.

Such a double clutch transmission (DCT) attempts to compactly realize a multi-stage transmission performing more than five speeds. The DCT achieves an automated manual transmission (AMT) that does not require a manual shifting by a driver, by controlling two clutches and synchronizing devices by a controller.

In comparison with an automatic transmission using planetary gears, such a DCT shows merits, such as higher efficiency in power delivery, easier modification in revising or adding parts in order to achieve more shift-stages, etc., and thus gathers more spotlight since it shows better success rates to comply with fuel consumption regulation and efficiency while achieving more shift-stages.

SUMMARY

The present disclosure provides a power transmission apparatus for a vehicle having advantages of achieving eight forward speed stages and a reverse speed stage, improving fuel economy by adding one planetary gear sets to a DCT including two synchronizers.

One form of the present disclosure provides a power transmission apparatus for a vehicle having further advantages of simplifying an interior layout and decreasing weight of the power transmission apparatus by reducing the number of components, and of improving fuel economy by achieving eight forward speed stages and one reverse speed stage with two synchronizers and one planetary gear set.

An exemplary power transmission apparatus for a vehicle includes: first, second, and third input shafts, first and second output shafts, an odd-numbered shift-stage shifting section, an even-numbered shift-stage shifting section, and a compound shifting section.

The first input shaft may be fixedly connected with a power source. The second input shaft may be formed of a hollow shaft, which is coaxially disposed with the first input shaft and may surrounds the first input shaft, and may be selectively connected with the first input shaft via a first clutch. The third input shaft may be formed of a hollow shaft, which is coaxially disposed with the second input shaft and surrounds the second input shaft, and selectively connected with the first input shaft via a second clutch. The first output shaft may be disposed in parallel with the first input shaft. The second output shaft may be arranged in series to and on a same axis with the first output shaft, and selectively connected with the first output shaft. The odd-numbered shift-stage shifting section may receive a torque of the second input shaft, and may shift the received torque to two shifted torques, the shifted torques being outputted to the first output shaft. The even-numbered shift-stage shifting section may receive a torque of the third input shaft, and may shift the received torque to one shifted torque and one reverse torque, the one shifted torque and one reverse torque being outputted to the first output shaft. The compound shifting section may selectively receive an output torque from the first input shaft and the first output shaft, and may shift the received output torque to a shifted output torque, the shifted output torque being outputted to a final reduction device through the second output shaft.

The shifting sections may be located in the order of the compound shifting section, the even-numbered/reverse shift-stage shifting section, the odd-numbered shift-stage shifting section, from an engine side.

The odd-numbered shift-stage shifting section may include a 1/7 drive gear rotatably disposed on the third input shaft, a 3/5 drive gear rotatably disposed on the third input shaft, a first synchronizer selectively connecting the third input shaft to the 1/7 drive gear or the 3/5 drive gear, a 1/7 driven gear integrally formed on the first output shaft and externally gear-meshed with the 1/7 drive gear, and a 3/5 driven gear integrally formed on the first output shaft and externally gear-meshed with the 3/5 drive gear.

The even-numbered/reverse shift-stage shifting may include a 2/6 drive gear rotatably disposed on the second input shaft, a 8/R drive gear rotatably disposed on the second input shaft, a second synchronizer selectively connecting the second input shaft to the 2/6 drive gear or the 8/R drive gear, a 2/6 driven gear integrally formed on the first output shaft and externally gear-meshed with the 2/6 drive gear, and a 8/R driven gear integrally formed on the first output shaft and externally gear-meshed with the 8/R drive gear via an idling gear.

The compound shifting section may include a planetary gear set coaxially disposed on the first input shaft without rotational interference, the planetary gear set having a sun gear, a planet carrier, and a ring gear. The sun gear may be fixedly connected with a drive gear of the even-numbered/reverse shift-stage shifting section. The planet carrier may be selectively connected with the first input shaft by a third clutch. The ring gear may be fixedly connected with an intermediate drive gear, wherein the intermediate drive gear is externally gear-meshed with an intermediate driven gear integrally formed on the second output shaft.

The sun gear may be fixedly connected with the 2/6 drive gear of the even-numbered/reverse shift-stage shifting section.

The planetary gear set may be a single pinion planetary gear set.

The compound shifting section may include a planetary gear set coaxially disposed on the first input shaft without rotational interference, the planetary gear set having a sun gear, a planet carrier, and a ring gear. The sun gear may be fixedly connected with a drive gear of the even-numbered/reverse shift-stage shifting section. The planet carrier may be fixedly connected with the first input shaft. The ring gear may be selectively connected with an intermediate drive gear by a third clutch, wherein the intermediate drive gear may be externally gear-meshed with an intermediate driven gear integrally formed on the second output shaft.

The second output shaft may be selectively connected with the first output shaft by a fourth clutch.

The exemplary form of the present disclosure may achieve one reverse speed and eight forward speeds by adding one planetary gear set to a DCT provided with two synchronizers. Therefore, multiple speed stages are achieved and fuel economy is improved.

In addition, an interior layout may be simplified, and length and weight of the DCT may be reduced by using less number of components.

In addition, since even-numbered speed stages and odd-numbered speed stages are achieved by turns by alternately operating two clutches, smooth shift may be achieved.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a shifting operational chart for a power transmission apparatus for a vehicle according to a first exemplary form of the present disclosure.

Figure 1:
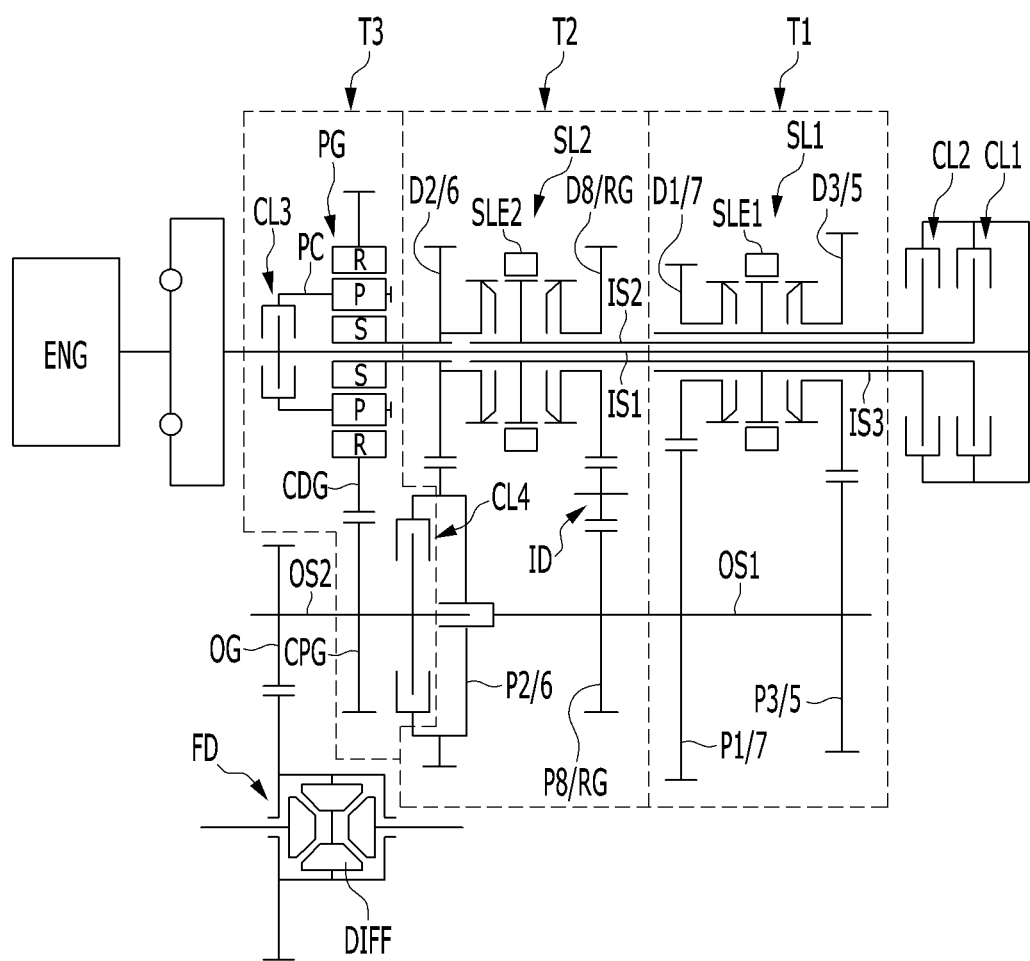
FIG. 1 is a schematic view of a power transmission apparatus for a vehicle according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

FIG. 1 is a schematic view of a power transmission apparatus for a vehicle according to a first exemplary form of the present disclosure.

Referring to FIG. 1, a power transmission apparatus for a vehicle realizes shift-stages of eight forward speeds and one reverse speed.

A torque of the engine ENG as a power source is shifted into four stages in an odd-numbered shift-stage shifting section T1 and an even-numbered/reverse shift-stage shifting section T2. For low shift-stages, the shifted torque of the shifting sections T1 and T2 is output without employing a further shifting. For high shift-stages, the shifted torque of the shifting sections T1 and T2 is further shifted to an increased speed ratio in a compound shifting section T3.

The engine ENG as a power source may be realized as a various kind of typical engines such as a gasoline engine or a diesel engine that uses fossil fuel.

The torque generated at the engine ENG is transmitted to the odd-numbered shift-stage shifting section T1, the even-numbered/reverse shift-stage shifting section T2, and compound shifting section T3 depending on how the first, second, and third input shafts IS1, IS2, and IS3 are interconnected.

The first input shaft IS1 is fixedly connected with an output side of the engine ENG, and transmits the torque of the engine ENG to the compound shifting section T3.

The second input shaft IS2 is formed as a hollow shaft, and is disposed coaxial with and exterior to the first input shaft IS1 without rotational interference. The second input shaft IS2 is selectively connected with the first input shaft IS1 via a first clutch CL1, and selectively transmits the torque of the engine ENG to the even-numbered/reverse shift-stage shifting section T2.

The third input shaft IS3 is formed as a hollow shaft, and is disposed coaxial with and exterior to the second input shaft IS2 without rotational interference. The third input shaft IS3 is selectively connected with the first input shaft IS1 via a second clutch CL2, and selectively transmits the torque of the engine ENG to the odd-numbered shift-stage shifting section T1.

The odd-numbered shift-stage shifting section T1 includes a 1/7 drive gear D1/7 for the forward first and seventh speeds, a 3/5 drive gear D3/5 for the forward third and fifth speeds, a first synchronizer SL1 arranged on the third input shaft IS3, a 1/7 driven gear P1/7 for the forward first and seventh speeds, and a 3/5 driven gear P3/5 for the forward third and fifth speeds. A first output shaft OS1 disposed in parallel with the third input shaft IS3. The 1/7 driven gear P1/7 is integrally formed at the first output shaft OS1 and externally gear-meshed with the 1/7 drive gear D1/7. The 3/5 driven gear P3/5 is integrally formed at the first output shaft OS1 and externally gear-meshed with the 3/5 drive gear D3/5.

The first synchronizer SL1 selectively connects the 1/7 drive gear D1/7 and the 3/5 drive gear D3/5 to the third input shaft IS.

The odd-numbered shift-stage shifting section T1 may be utilized for the forward first speed, the forward seventh speed, the forward third speed, and the forward fifth speed.

The even-numbered/reverse shift-stage shifting section T2 includes a 2/6 drive gear D2/6 for the forward second and sixth speeds, a 8R drive gear D8/RG for the forward eighth speed and a reverse speed, a second synchronizer SL2 arranged on the second input shaft IS2, a 2/6 driven gear P2/6 for the forward second and sixth speeds, and a 8R driven gear P8/RG for the forward eighth speed and the reverse speed. The first output shaft OS1 disposed in parallel with the second input shaft IS2. The 2/6 driven gear P2/6 is integrally formed at the first output shaft OS1 and externally gear-meshed with the 2/6 drive gear D2/6. The 8R driven gear P8/RG is integrally formed at the first output shaft OS1 and externally gear-meshed with the 8R drive gear D8/RG interposing an idler ID.

The second synchronizer SL2 selectively connects the 2/6 drive gear D2/6 and the 8R drive gear D8/RG to the second input shaft IS2.

The even-numbered/reverse shift-stage shifting section T2 may be utilized for the forward second speed, the forward sixth speed, the forward eighth speed, and the reverse speed.

The first and second synchronizers SL1 and SL2 may be formed as a known scheme, and respective sleeves SLE1 and SLE2 applied to the first and second synchronizers SL1 and SL2 may be operated by actuators (not shown) that may be controlled by a transmission control unit The compound shifting section T3 includes a planetary gear set PG, third and fourth clutches CL3 and CL4, and a second output shaft OS2. The planetary gear set PG is arranged on the first input shaft IS1 without rotational interference, at an axial location between the engine ENG and the second synchronizer SL2. The second output shaft OS2 is disposed forward to and coaxially with the first output shaft IS1, and selectively connected with the first output shaft IS1 by the fourth clutch CL4.

The planetary gear set PG is a single pinion planetary gear set, and includes a sun gear S, a planet carrier PC supporting pinions P externally gear-meshed with the sun gear S, and a ring gear R internally gear-meshed with the pinions P.

The sun gear S is fixedly connected with the 2/6 drive gear D2/6, and the planet carrier PC is selectively connected with the first input shaft IS1. The ring gear R is fixedly connected with an intermediate drive gear CDG, and the intermediate drive gear CDG is externally gear-meshed with an intermediate driven gear CPG integrally formed at the second output shaft OS2.

A final output gear OG is integrally formed at the second output shaft OS2, and externally gear-meshed with a final reduction device FD including a differential DIFF.

The third clutch CL3 selectively connects the first input shaft IS1 and the planet carrier PC. The fourth clutch CL4 selectively connects the first output shaft OS1 and the second output shaft CL2.

The first, second, third, and fourth clutches CL1, CL2, CL3, and CL4 may be realized as multi-plate hydraulic pressure friction devices that are frictionally engaged by hydraulic pressure.

FIG. 2 is a shifting operational chart for a power transmission apparatus for a vehicle according to a first exemplary form of the present disclosure. The shifting operation of the power transmission is hereinafter described in detail.

[The Reverse Speed]

In the reverse speed REV, as shown in FIG. 2, the 8R drive gear D8/RG and second input shaft IS2 are synchronously connected by the sleeve SEL2 of the second synchronizer SL2, and the first clutch CL1 and the fourth clutch CL4 are operated.

Accordingly, the torque of the engine ENG is output to the final reduction device FD having the differential DIFF through the first input shaft IS1, the first clutch CL1, the second input shaft IS2, the 8R drive gear D8/RG, the idler ID, the 8R driven gear P8/RG, the first output shaft OS1, the fourth clutch CL4, the second output shaft OS2, and the final output gear OG. During the power transmission, rotation is reversed, and thus the reverse speed is realized.

[The Forward First Speed]

In the forward first speed D1, as shown in FIG. 2, the 1/7 drive gear D1/7 and third input shaft IS3 are synchronously connected by the sleeve SEL1 of the first synchronizer SL1, and the second clutch CL2 and the fourth clutch CL4 are operated.

Accordingly, the torque of the engine ENG is output to the final reduction device FD having the differential DIFF through the first input shaft IS1, the second clutch CL2, the third input shaft IS3, the 1/7 drive gear D1/7, the 1/7 driven gear P1/7, the first output shaft OS1, the fourth clutch CL4, the second output shaft OS2, and the final output gear OG. Thus, the forward first speed is realized.

[The Forward Second Speed]

In the forward second speed D2, as shown in FIG. 2, the 2/6 drive gear D2/6 and the second input shaft IS2 are synchronously connected by the sleeve SEL2 of the second synchronizer SL2, and the first clutch CL1 and the fourth clutch CL4 are operated.

Accordingly, the torque of the engine ENG is output to the final reduction device FD having the differential DIFF through the first input shaft IS1, the first clutch CL1, the second input shaft IS2, the 2/6 drive gear D2/6, the 2/6 driven gear P2/6, the first output shaft OS1, the fourth clutch CL4, the second output shaft OS2, and the final output gear OG. Thus, the forward second speed is realized.

[The Forward Third Speed]

In the forward third speed D3, as shown in FIG. 2, the 3/5 drive gear D3/5 and third input shaft IS3 are synchronously connected by the sleeve SEL1 of the first synchronizer SL1, and the second clutch CL2 and the fourth clutch CL4 are operated.

Accordingly, the torque of the engine ENG is output to the final reduction device FD having the differential DIFF through the first input shaft IS1, the second clutch CL2, the third input shaft IS3, the 3/5 drive gear D3/5, the 3/5 driven gear P3/5, the first output shaft OS1, the fourth clutch CL4, the second output shaft OS2, and the final output gear OG. Thus, the forward third speed is realized.

[The Forward Fourth Speed]

In the forward fourth speed D4, as shown in FIG. 2, the third clutch CL3 and the fourth clutch CL4 are operated.

Accordingly, the torque of the engine ENG is input to the planet carrier PC of the planetary gear set PG through the first input shaft IS1 and the third clutch CL3. In this state, by the operation of the fourth clutch CL4, the sun gear S and the ring gear R are connected with each other through the 2/6 drive gear D2/6, the 2/6 driven gear P2/6, the fourth clutch CL4, the second output shaft OS2, and the intermediate drive gear CDG.

In this state, while the planet carrier PC receives an input torque, the sun gear S and the ring gear R rotates at different rotation speeds that results from a gear ratio between the 2/6 drive gear D2/6 and the 2/6 driven gear P2/6 and a gear ratio between the intermediate drive gear CDG and the intermediate driven gear CPG. Therefore, the ring gear R outputs a shifted speed and torque to the second output shaft OS2, and the speed of the second output shaft OS2 is output to the final reduction device FD having the differential DIFF through the final output gear OG. Thus, the forward fourth speed is realized.

Meanwhile, the synchronous connection between the 3/5 drive gear D3/5 and the third input shaft IS3 by the sleeve SEL1 of the first synchronizer SL1 in the forward third speed may be maintained the forward fourth speed D4.

[The Forward Fifth Speed]

In the forward fifth speed D5, as shown in FIG. 2, the 3/5 drive gear D3/5 and third input shaft IS3 are synchronously connected by the sleeve SEL1 of the first synchronizer SL1, and the second clutch CL2 and the third clutch CL3 are operated.

The torque of the engine ENG is partially input to the sun gear S of the planetary gear set PG in the compound shifting section T3 through the first input shaft IS1, the second clutch CL2, the third input shaft IS3, the 3/5 drive gear D3/5, the 3/5 driven gear P3/5, the first output shaft OS1, the 2/6 driven gear P2/6, and the 2/6 drive gear D2/6. In addition, the torque of the engine ENG is also partially input to the planet carrier PC of the planetary gear set PG in the compound shifting section T3 through the first input shaft IS1 and the third clutch CL3.

Then, the sun gear S and the planet carrier PC of the planetary gear set PG in the compound shifting section T3 rotates at different speeds, and therefore the ring gear R outputs a shifted output torque to the final reduction device FD having the differential DIFF, through the intermediate drive gear CDG, the intermediate driven gear CPG, the second output shaft OS2, and the final output gear OG. Thus, the forward fifth speed is realized.

[The Forward Sixth Speed]

In the forward sixth speed D6, as shown in FIG. 2, the 2/6 drive gear D2/6 and second input shaft IS2 are synchronously connected by the sleeve SEL2 of the second synchronizer SL2, and the first clutch CL1 and the third clutch CL3 are operated.

The torque of the engine ENG is partially input to the sun gear S of the planetary gear set PG in the compound shifting section T3 through the first input shaft IS1, the first clutch CL1, the second input shaft IS2, and the 2/6 drive gear D2/6. In addition, the torque of the engine ENG is also partially input to the planet carrier PC of the planetary gear set PG in the compound shifting section T3 through the first input shaft IS1 and the third clutch CL3.

Then, the sun gear S and the planet carrier PC of the planetary gear set PG in the compound shifting section T3 rotates at a same speed, and the ring gear R outputs an input torque as inputted. The output torque is transmitted to the final reduction device FD, through the intermediate drive gear CDG, the intermediate driven gear CPG, the second output shaft OS2, and the final output gear OG. Thus, the forward sixth speed is realized.

[The Forward Seventh Speed]

In the forward seventh speed D7, as shown in FIG. 2, the 1/7 drive gear D1/7 and third input shaft IS3 are synchronously connected by the sleeve SEL1 of the first synchronizer SL1, and the second clutch CL2 and the third clutch CL3 are operated.

The torque of the engine ENG is partially input to the sun gear S of the planetary gear set PG in the compound shifting section T3 through the first input shaft IS1, the second clutch CL2, the third input shaft IS3, the 1/7 drive gear D1/7, the 1/7 driven gear P1/7, the first output shaft OS1, the 2/6 driven gear P2/6, and the 2/6 drive gear D2/6. In addition, the torque of the engine ENG is also partially input to the planet carrier PC of the planetary gear set PG in the compound shifting section T3 through the first input shaft IS1 and the third clutch CL3.

Then, the sun gear S and the planet carrier PC of the planetary gear set PG in the compound shifting section T3 rotates at different speeds, and therefore the ring gear R outputs a shifted output torque to the final reduction device FD having the differential DIFF, through the intermediate drive gear CDG, the intermediate driven gear CPG, the second output shaft OS2, and the final output gear OG. Thus, the forward seventh speed is realized.

[The Forward Eighth Speed]

In the forward eighth speed D8, as shown in FIG. 2, the 8R drive gear D8/RG and second input shaft IS2 are synchronously connected by the sleeve SEL2 of the second synchronizer SL2, and the first clutch CL1 and the third clutch CL3 are operated.

Accordingly, the torque of the engine ENG is partially input to the sun gear S of the planetary gear set PG in the compound shifting section T3 through the first input shaft IS1, the first clutch CL1, the second input shaft IS2, the 8R drive gear D8/RG, the idler ID, the 8R driven gear P8/RG, the first output shaft OS1, the 2/6 driven gear P2/6, and the 2/6 drive gear D2/6. Because of the idler ID, the sun gear S rotates in a reverse direction as in the reverse speed. In addition, the torque of the engine ENG is also partially input to the planet carrier PC of the planetary gear set PG in the compound shifting section T3 through the first input shaft IS1 and the third clutch CL3.

Then, the planet carrier PC and the reversely rotating sun gear S of the planetary gear set PG results in a further increased output speed of the ring gear R. The output speed of the ring gear R is transmitted to the final reduction device FD having the differential DIFF through the intermediate drive gear CDG, the intermediate driven gear CPG, the second output shaft OS2, and the final output gear OG. Thus, the forward eighth speed.

In the above description, operating state in each shift-stage is focused. When upshifting by one shift-stage, a synchronizer for next upshifting may be preliminarily operated. When downshifting by one shift-stage, a synchronizer for next downshifting may be preliminarily operated.

Figure 3:
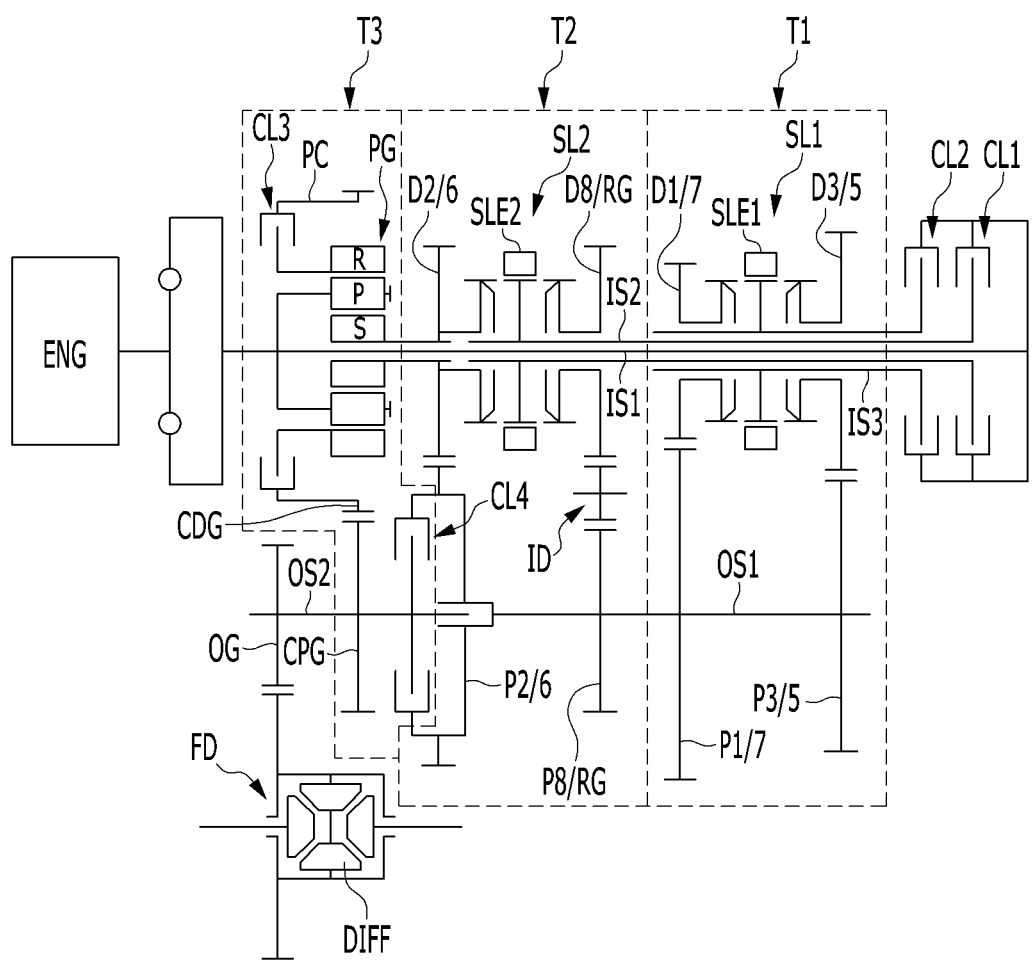
FIG. 3 is a schematic view of a power transmission apparatus for a vehicle according to a second exemplary form of the present disclosure.

FIG. 3 is a schematic view of a power transmission apparatus for a vehicle according to a second exemplary form of the present disclosure.

According to a first exemplary form of the present disclosure, the third clutch CL3 variably or selectively connects first input shaft IS1 and the planet carrier PC of the planetary gear set PG. However, according to a second exemplary form, the first input shaft IS1 is fixedly connected with the planet carrier PC, and the third clutch CL3 variably selectively connects the ring gear R and the intermediate drive gear CDG, as shown in FIG. 3.

Thus, the first and second exemplary forms only differ in locations of the third clutch CL3, and other arrangements and shifting operations are the same.

As described above, an exemplary form of the present disclosure may achieve one reverse speed and eight forward speeds by adding one planetary gear set to a DCT provided with two synchronizers. Therefore, multiple speed stages are achieved and fuel economy is improved.

In addition, an interior layout may be simplified, and length and weight of the DCT may be reduced with less number of components.

In addition, since even-numbered speed stages and odd-numbered speed stages are achieved by turns by alternately operating two clutches, smooth shift may be achieved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

CDG: intermediate drive gear
CPG: intermediate driven gear
CL1, CL2, CL3, CL4: first, second, third, and fourth clutches
D1/7: the 1/7 drive gear
D2/6: the 2/6 drive gear
D3/5: the 3/5 drive gear
D8/RG: the 8R drive gear
IS1, IS2, IS3, first, second, and third input shafts
OS1, OS2: first, second output shafts
P1/7: the 1/7 driven gear
P2/6: the 2/6 driven gear
P3/5: the 3/5 driven gear
P8/RG: the 8R driven gear
PG: planetary gear set
SL1, SL2: first and second synchronizers
T1: odd-numbered shift-stage shifting section
T2: even-numbered/reverse shift-stage shifting section
T3: compound shifting section

What is claimed is:

1. A power transmission apparatus for a vehicle, comprising:
   a first input shaft fixedly connected with a power source;
   a second input shaft in a form of hollow shaft coaxially disposed with the first input shaft, and configured to surround the first input shaft, the second input shaft configured to be selectively connected with the first input shaft via a first clutch;
   a third input shaft in a form of a hollow shaft coaxially disposed with the second input shaft and configured to surround the second input shaft, the third input shaft configured to be selectively connected with the first input shaft via a second clutch;
   a first output shaft disposed in parallel with the first input shaft;
   a second output shaft arranged in series to and on a same axis with the first output shaft, and selectively connected with the first output shaft;
   a first shift-stage shifting section configured to receive a torque of the third input shaft and to shift the received torque to two shifted torques, the shifted two torques being outputted to the first output shaft;
   a second shift-stage shifting section configured to receive a torque of the second input shaft and to shift the received torque to one shifted torque and one reverse torque, the one shifted torque and one reverse torque being outputted to the first output shaft;
   a compound shifting section configured to selectively receive an output torque from the first input shaft and the first output shaft and to shift the received output torque to a shifted output torque, the shifted output torque being outputted to a final reduction device through the second output shaft.

2. The power transmission apparatus of claim 1, wherein the first shift-stage, second shift-stage, and compound shifting sections are located in the order of the compound shifting section, the second shift-stage shifting section, the first shift-stage shifting section, from an engine side.

3. The power transmission apparatus of claim 1, wherein the first shift-stage shifting section comprises:
   a 1/7 drive gear rotatably disposed on the third input shaft;
   a 3/5 drive gear rotatably disposed on the third input shaft;
   a first synchronizer configured to selectively connect the third input shaft to the 1/7 drive gear or the 3/5 drive gear;
   a 1/7 driven gear integrally formed on the first output shaft and externally gear-meshed with the 1/7 drive gear; and
   a 3/5 driven gear integrally formed on the first output shaft and externally gear-meshed with the 3/5 drive gear.

4. The power transmission apparatus of claim 1, wherein the second shift-stage shifting section comprises:
   a 2/6 drive gear rotatably disposed on the second input shaft;
   a 8/R drive gear rotatably disposed on the second input shaft;
   a second synchronizer configured to selectively connect the second input shaft to the 2/6 drive gear or the 8/R drive gear;
   a 2/6 driven gear integrally formed on the first output shaft and externally gear-meshed with the 2/6 drive gear; and
   a 8/R driven gear integrally formed on the first output shaft and externally gear-meshed with the 8/R drive gear interposing an idler gear.

5. The power transmission apparatus of claim 1, wherein the compound shifting section comprises a planetary gear set coaxially disposed on the first input shaft without rotational interference, the planetary gear set having a sun gear, a planet carrier, and a ring gear, wherein:
   the sun gear is fixedly connected with a drive gear of the second shift-stage shifting section;
   the planet carrier is selectively connected with the first input shaft by a third clutch; and
   the ring gear is fixedly connected with an intermediate drive gear; and
   the intermediate drive gear is externally gear-meshed with an intermediate driven gear integrally formed on the second output shaft.

6. The power transmission apparatus of claim 5, wherein the sun gear is fixedly connected with a 2/6 drive gear of the second shift-stage shifting section.

7. The power transmission apparatus of claim 5, wherein the planetary gear set is a single pinion planetary gear set.

8. The power transmission apparatus of claim 1, wherein the compound shifting section comprises a planetary gear set coaxially disposed on the first input shaft without rotational interference, the planetary gear set having a sun gear, a planet carrier, and a ring gear, and
   wherein the sun gear is fixedly connected with a drive gear of the second shift-stage shifting section;
   the planet carrier is fixedly connected with the first input shaft;
   the ring gear is selectively connected with an intermediate drive gear by a third clutch; and
   the intermediate drive gear is externally gear-meshed with an intermediate driven gear integrally formed on the second output shaft.

9. The power transmission apparatus of claim 8, wherein the drive gear of the second shift-stage shifting section is a 2/6 drive gear fixedly connected with the sun gear.

10. The power transmission apparatus of claim 8, wherein the planetary gear set is a single pinion planetary gear set.

11. The power transmission apparatus of claim 1, wherein the second output shaft is selectively connected with the first output shaft by a fourth clutch.

* * * * *